(12) United States Patent
Skiles

(10) Patent No.: US 12,573,277 B2
(45) Date of Patent: Mar. 10, 2026

(54) LIGHT AND EMERGENCY ALERT SYSTEM

(71) Applicant: Teri Skiles, Montgomery, MI (US)

(72) Inventor: Teri Skiles, Montgomery, MI (US)

( * ) Notice: Subject to any disclaimer, the term of this patent is extended or adjusted under 35 U.S.C. 154(b) by 154 days.

(21) Appl. No.: 18/424,167

(22) Filed: Jan. 26, 2024

(65) Prior Publication Data

US 2025/0246058 A1     Jul. 31, 2025

(51) Int. Cl.
G08B 19/00 (2006.01)
G06F 3/14 (2006.01)
G08B 7/00 (2006.01)

(52) U.S. Cl.
CPC ............... G08B 19/00 (2013.01); G06F 3/14 (2013.01); G08B 7/00 (2013.01)

(58) Field of Classification Search
CPC ......... A61G 7/018; A62C 13/64; E21F 15/72; F24F 11/30; G01N 33/0031; G05B 19/0428; G05D 1/101; G06F 1/26; G06F 1/163; G06F 3/14; G08B 5/38; G08B 7/00; G08B 7/064; G08B 7/066; G08B 17/10; G08B 17/103; G08B 19/00; G08B 21/12; G08B 25/009; G08B 25/012; H02J 9/02; H04L 67/12
USPC ........................................................ 340/586
See application file for complete search history.

(56) References Cited

U.S. PATENT DOCUMENTS

| | | | |
|---|---|---|---|
| 4,617,561 A | 10/1986 | Brown | |
| D290,406 S | 6/1987 | Brown | |
| 4,716,402 A | 12/1987 | Francis | |
| 4,862,148 A | 8/1989 | Kichline | |
| 5,731,759 A | * 3/1998 | Finucan | G08B 5/36 340/693.6 |
| 6,154,130 A | 11/2000 | Mondejar | |
| 7,311,526 B2 | * 12/2007 | Rohrbach | G06F 1/18 439/39 |
| 7,558,564 B2 | * 7/2009 | Wesby | H04W 4/00 455/410 |
| 8,783,908 B2 | 7/2014 | Gross | |
| 9,147,327 B2 | 9/2015 | Breier | |
| 9,843,208 B2 | 12/2017 | Inskeep | |
| 10,153,657 B1 | * 12/2018 | Koifman | H02J 7/342 |
| 11,715,971 B1 | * 8/2023 | Hill | H02J 7/342 455/575.1 |
| 2003/0214390 A1 | * 11/2003 | Hollister | E05C 17/54 340/326 |

(Continued)

FOREIGN PATENT DOCUMENTS

| | | |
|---|---|---|
| CA | 2472137 | 12/2005 |

*Primary Examiner* — Stephen R Burgdorf

(57)     ABSTRACT

A light and emergency alert system for alerting individuals to smoke or carbon monoxide in combination with a flashlight includes a housing that contains a processor. A light source is mounted to and directed away from the housing. A hazard detector mounted in the housing adjacent to a vent extending through the housing. An alarm indicator is mounted to the housing. The processor is programmed to selectively activate the light source. The hazard detector senses for hazardous conditions in a surrounding atmosphere via the vent, including a presence of smoke and a presence of a concentration of carbon monoxide greater than a predetermined threshold. The processor causes the alarm indicator to emit an alert signal when the hazard detector senses one of the hazardous conditions.

7 Claims, 10 Drawing Sheets

(56)  References Cited

U.S. PATENT DOCUMENTS

| | | | | |
|---|---|---|---|---|
| 2014/0231109 | A1* | 8/2014 | Hudak | A62C 13/64 |
| | | | | 169/30 |
| 2015/0156301 | A1* | 6/2015 | Crawford | H04M 1/724092 |
| | | | | 455/420 |
| 2015/0247831 | A1* | 9/2015 | Lewis | H04M 1/21 |
| | | | | 455/566 |
| 2016/0029896 | A1* | 2/2016 | Lee | A61B 5/7221 |
| | | | | 600/474 |
| 2016/0294427 | A1* | 10/2016 | Wojcik | H04B 1/3888 |
| 2022/0217517 | A1* | 7/2022 | Daoura | H04W 4/80 |

* cited by examiner

Figure 8:
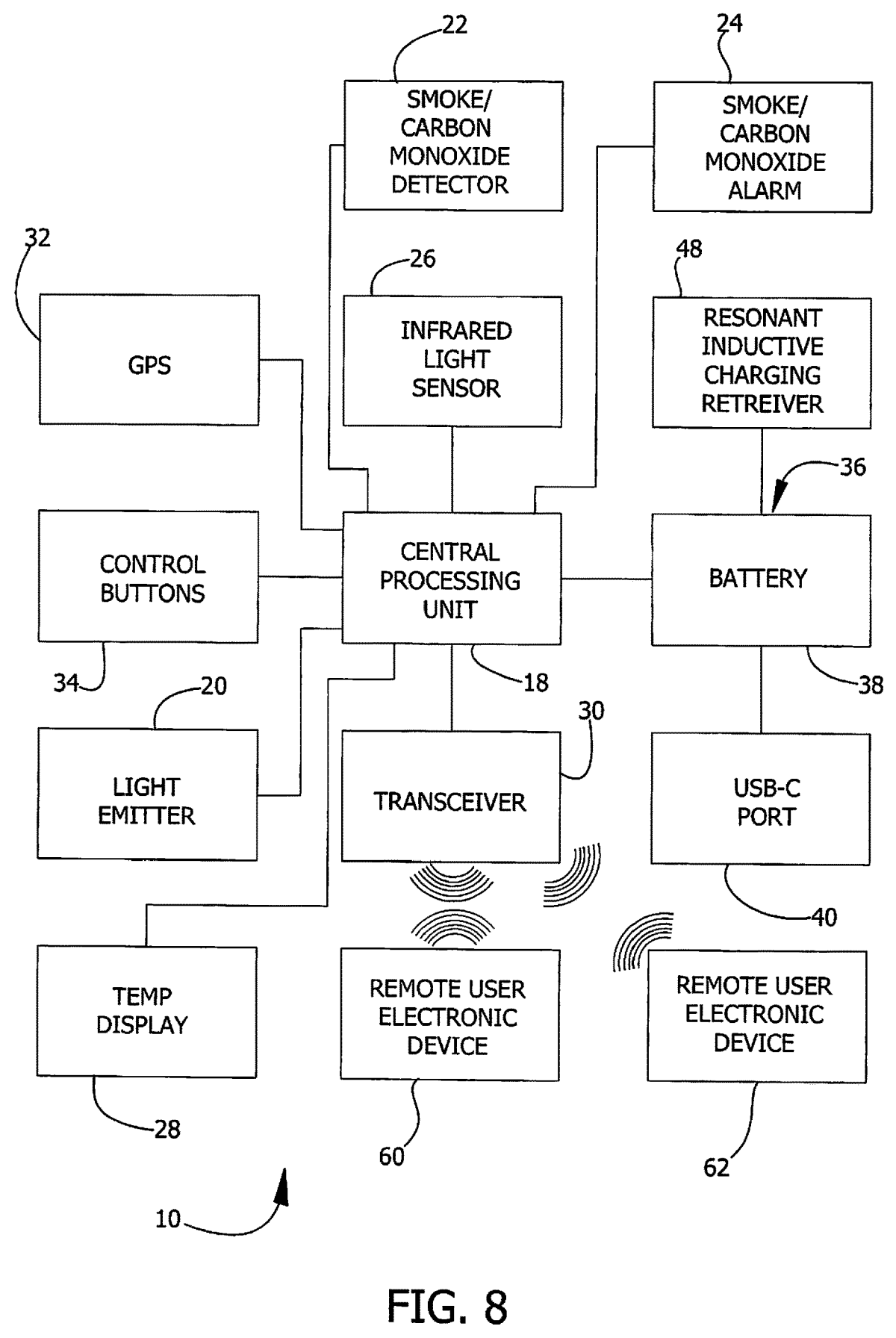

22

SMOKE/
CARBON
MONOXIDE
DETECTOR

24

SMOKE/
CARBON
MONOXIDE
ALARM

32

GPS

26

INFRARED
LIGHT
SENSOR

48

RESONANT
INDUCTIVE
CHARGING
RETREIVER

36

CONTROL
BUTTONS

CENTRAL
PROCESSING
UNIT

BATTERY

34

20

18

38

LIGHT
EMITTER

TRANSCEIVER

30

USB-C
PORT

TEMP
DISPLAY

REMOTE USER
ELECTRONIC
DEVICE

40

REMOTE USER
ELECTRONIC
DEVICE

LIGHT AND EMERGENCY ALERT SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to light and emergency alert systems and more particularly pertains to a new light and emergency alert system for alerting individuals to smoke or carbon monoxide in combination with a flashlight.

(2) Description of Related Art Including Information Disclosed Under 37 CFR 1.97 and 1.98

The prior art relates to light and emergency alert systems which provide a smoke or fire detector in a flashlight. However, the prior art fails to include a carbon monoxide detector, a temperature sensor, and magnetic mounting and charging modules in a flashlight-style apparatus.

BRIEF SUMMARY OF THE INVENTION

An embodiment of the disclosure meets the needs presented above by generally comprising a housing that contains a processor. A light source is mounted to and directed away from the housing. A hazard detector mounted in the housing adjacent to a vent extending through the housing. An alarm indicator is mounted to the housing. The processor is programmed to selectively activate the light source. The hazard detector senses for hazardous conditions in a surrounding atmosphere via the vent, including a presence of smoke and a presence of a concentration of carbon monoxide greater than a predetermined threshold. The processor causes the alarm indicator to emit an alert signal when the hazard detector senses one of the hazardous conditions.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 8 is a block diagram of an embodiment of the disclosure.

DETAILED DESCRIPTION OF THE INVENTION

Figure 1:
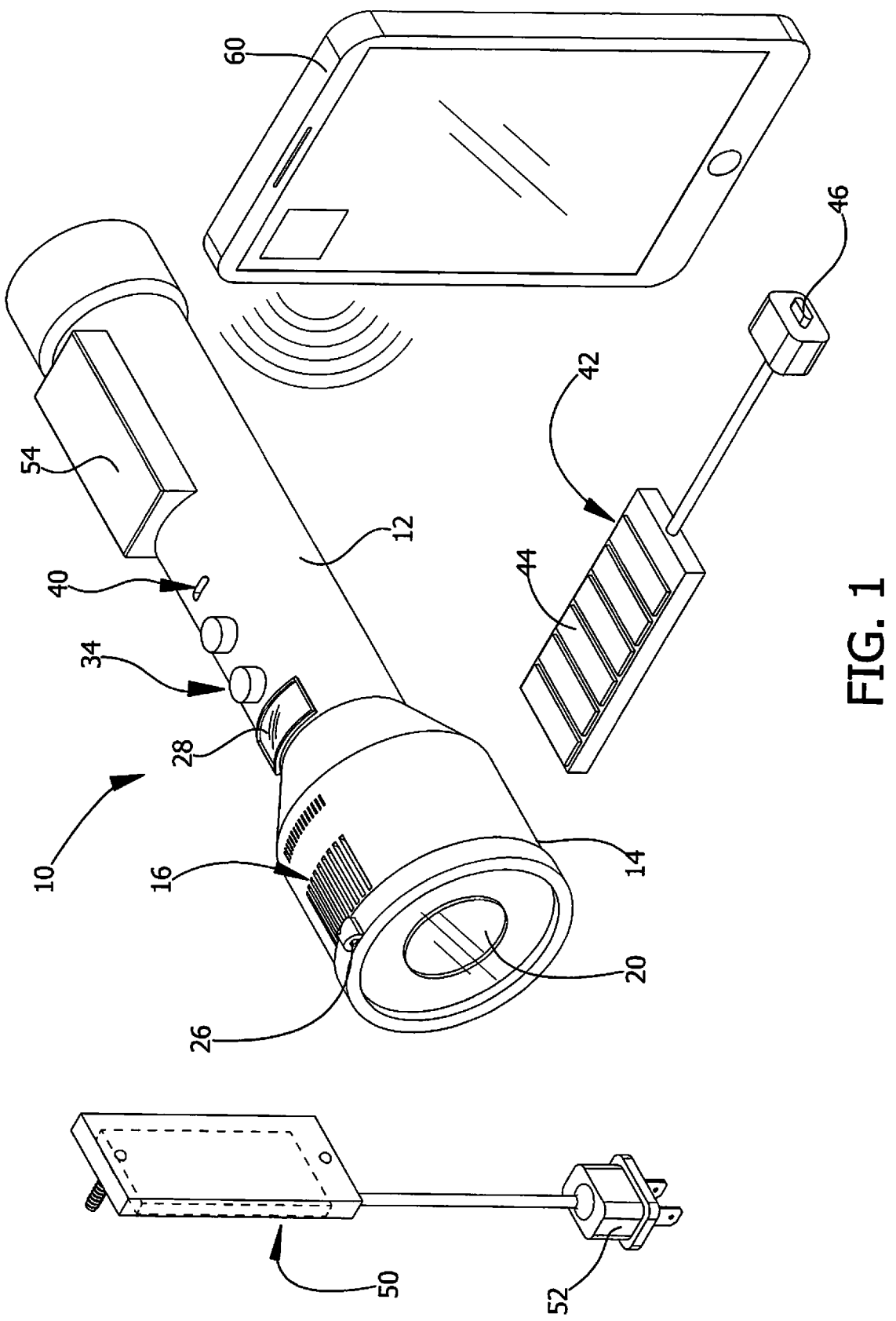
FIG. 1 is a kit view of a light and emergency alert system according to an embodiment of the disclosure.
Figure 2:
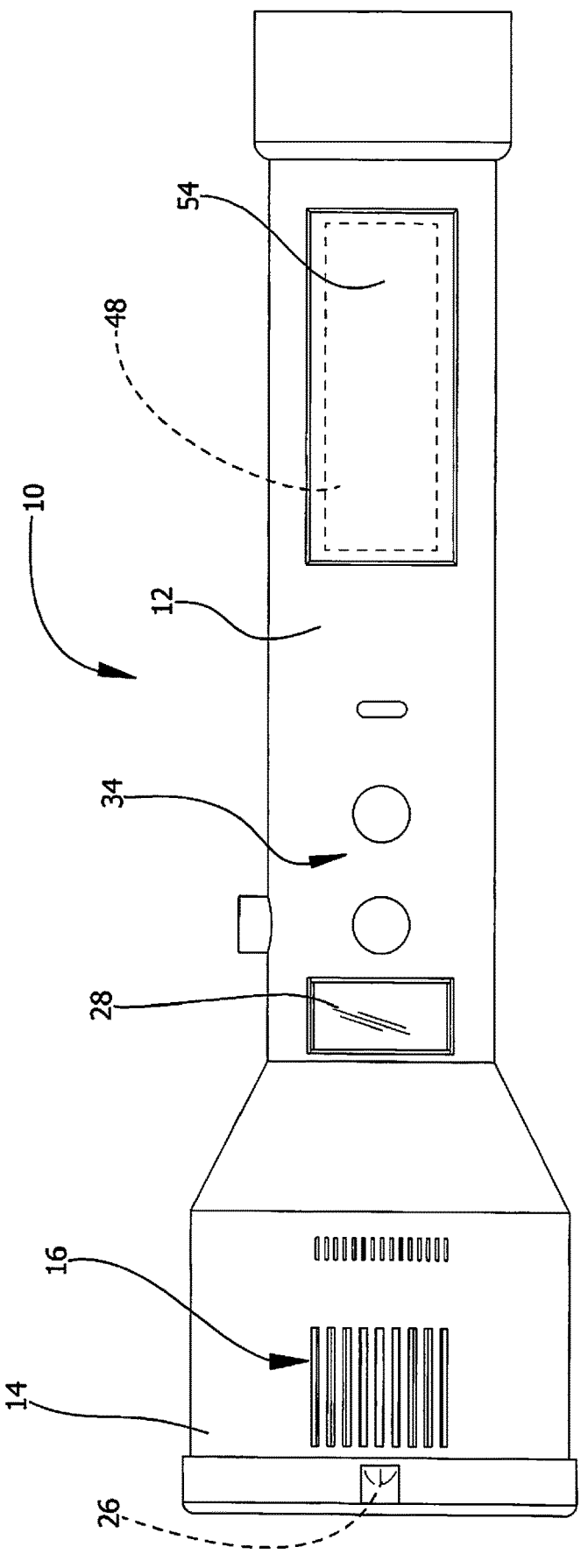
FIG. 2 is a top view of an embodiment of the disclosure.
Figure 3:
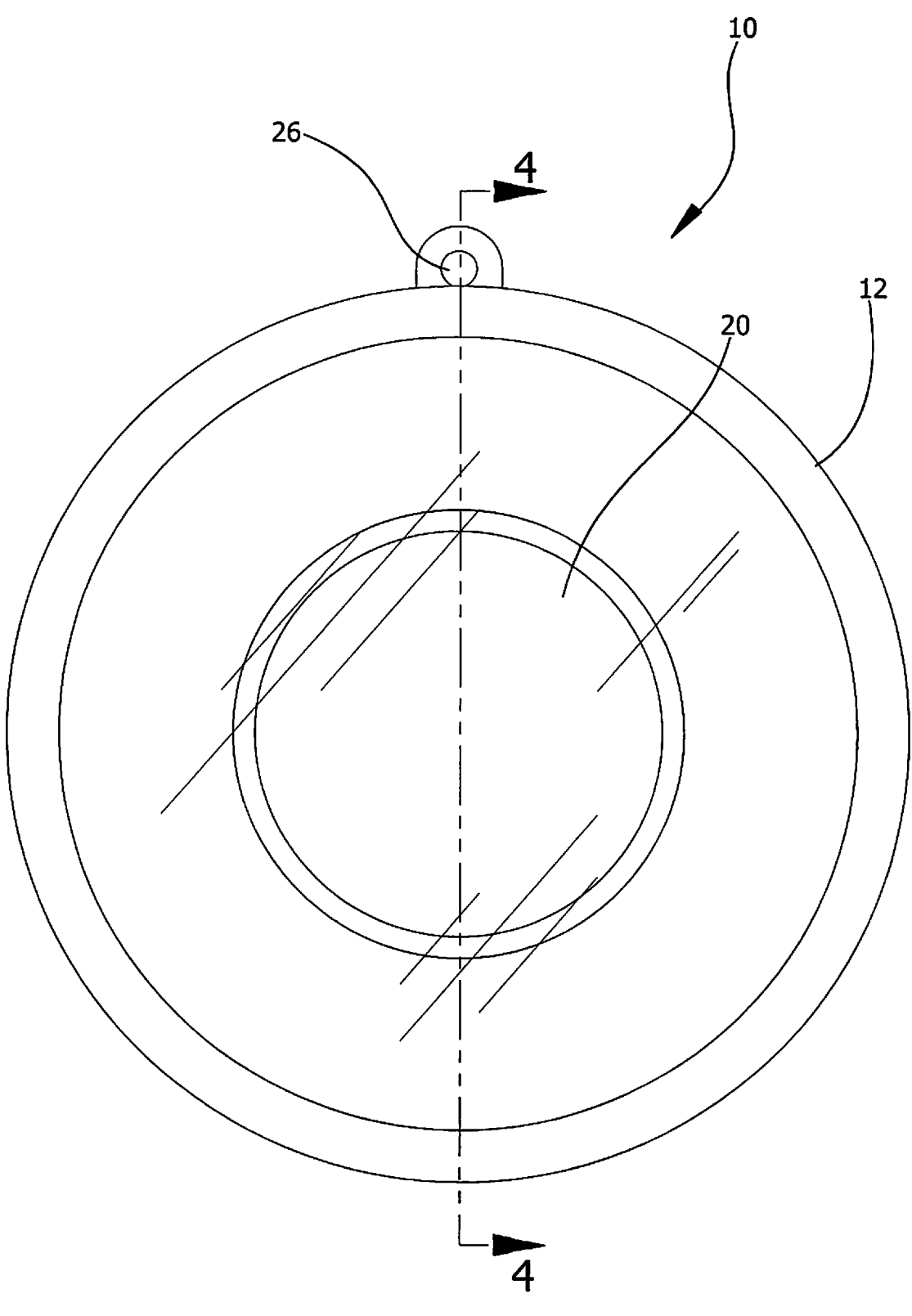
FIG. 3 is a front view of an embodiment of the disclosure.
Figure 4:
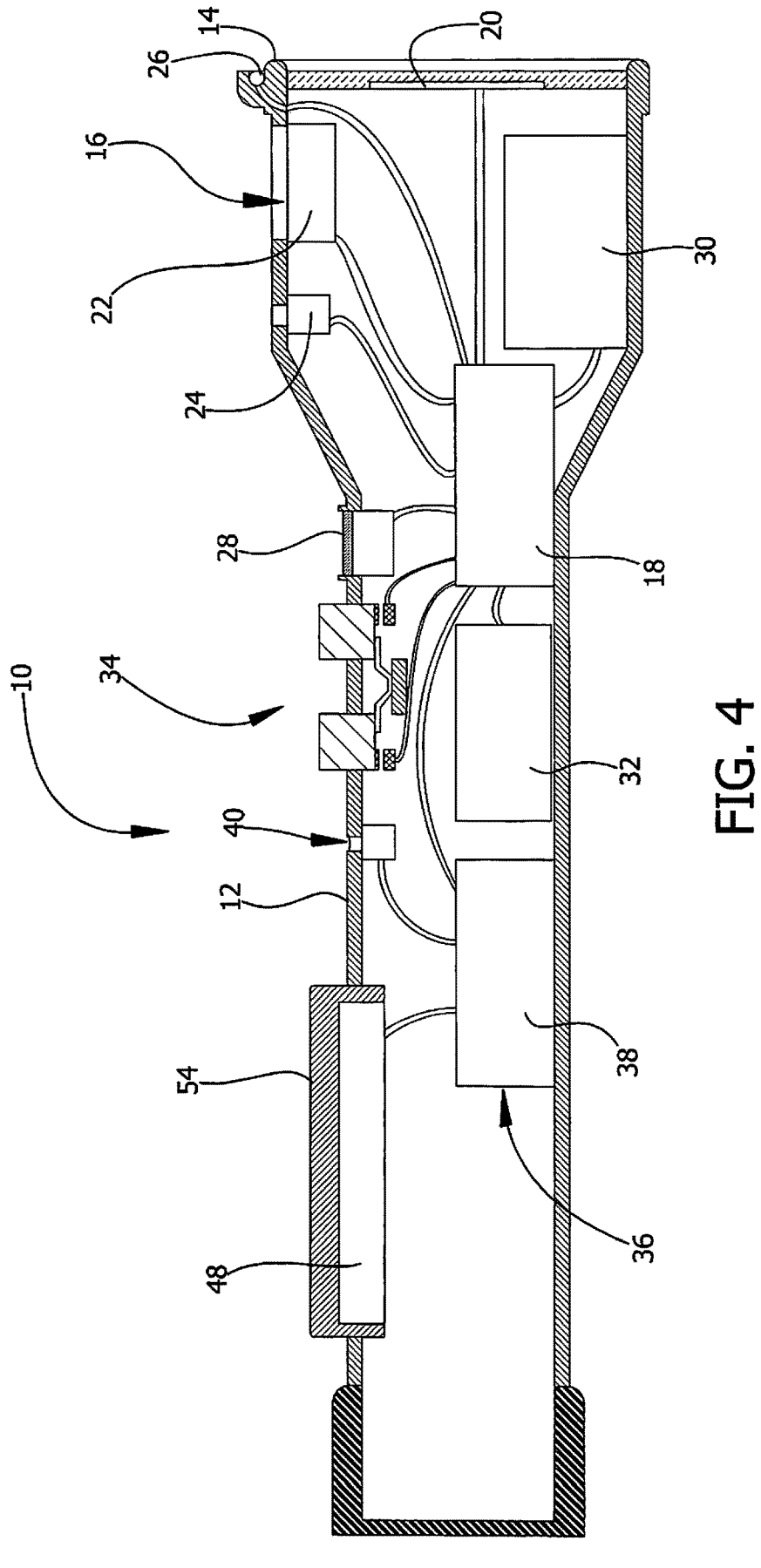
FIG. 4 is a cross-section view of an embodiment of the disclosure taken from Arrows 4-4 in FIG. 3.
Figure 5:
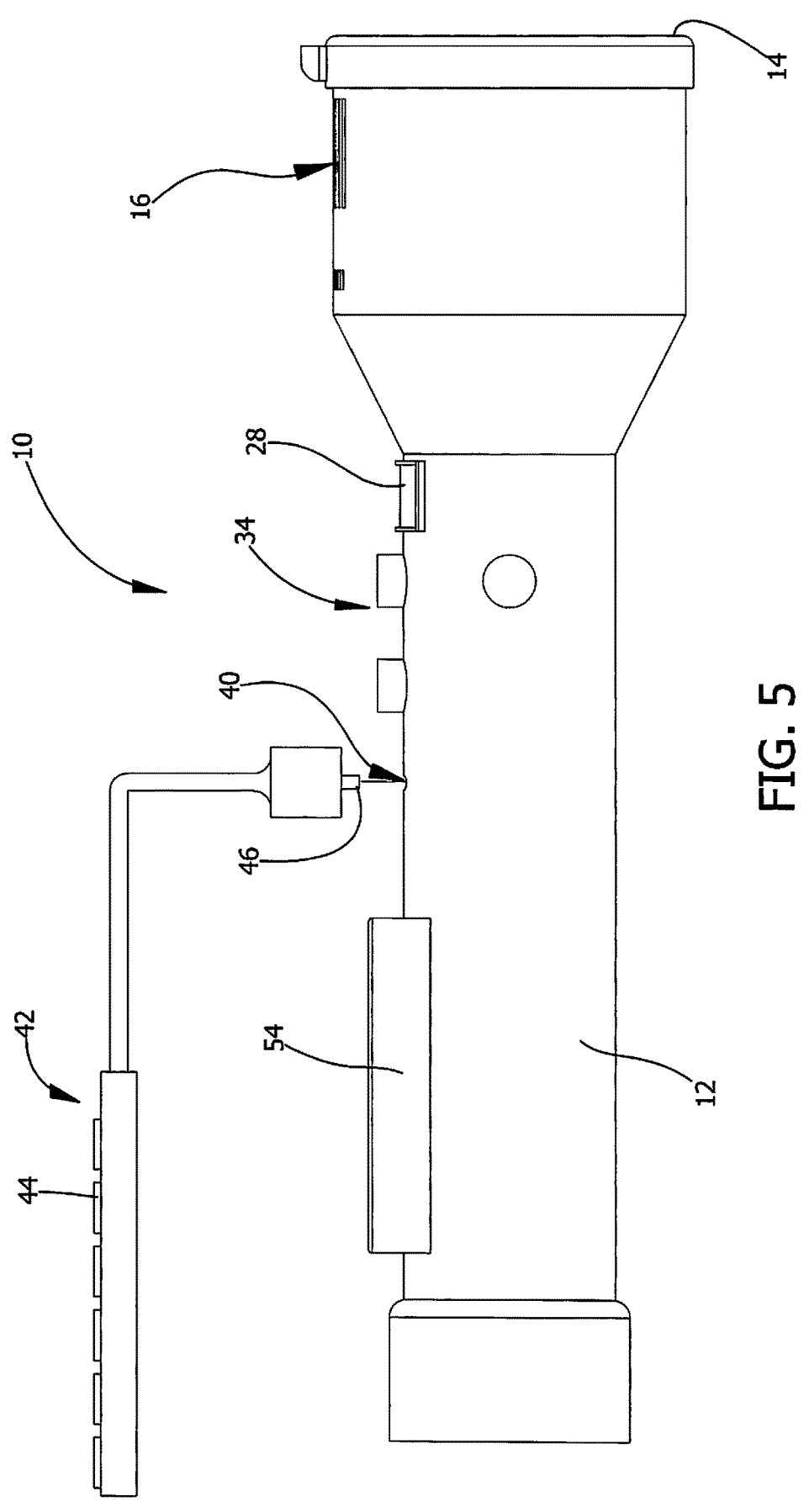
FIG. 5 is a side view of an embodiment of the disclosure.
Figure 6:
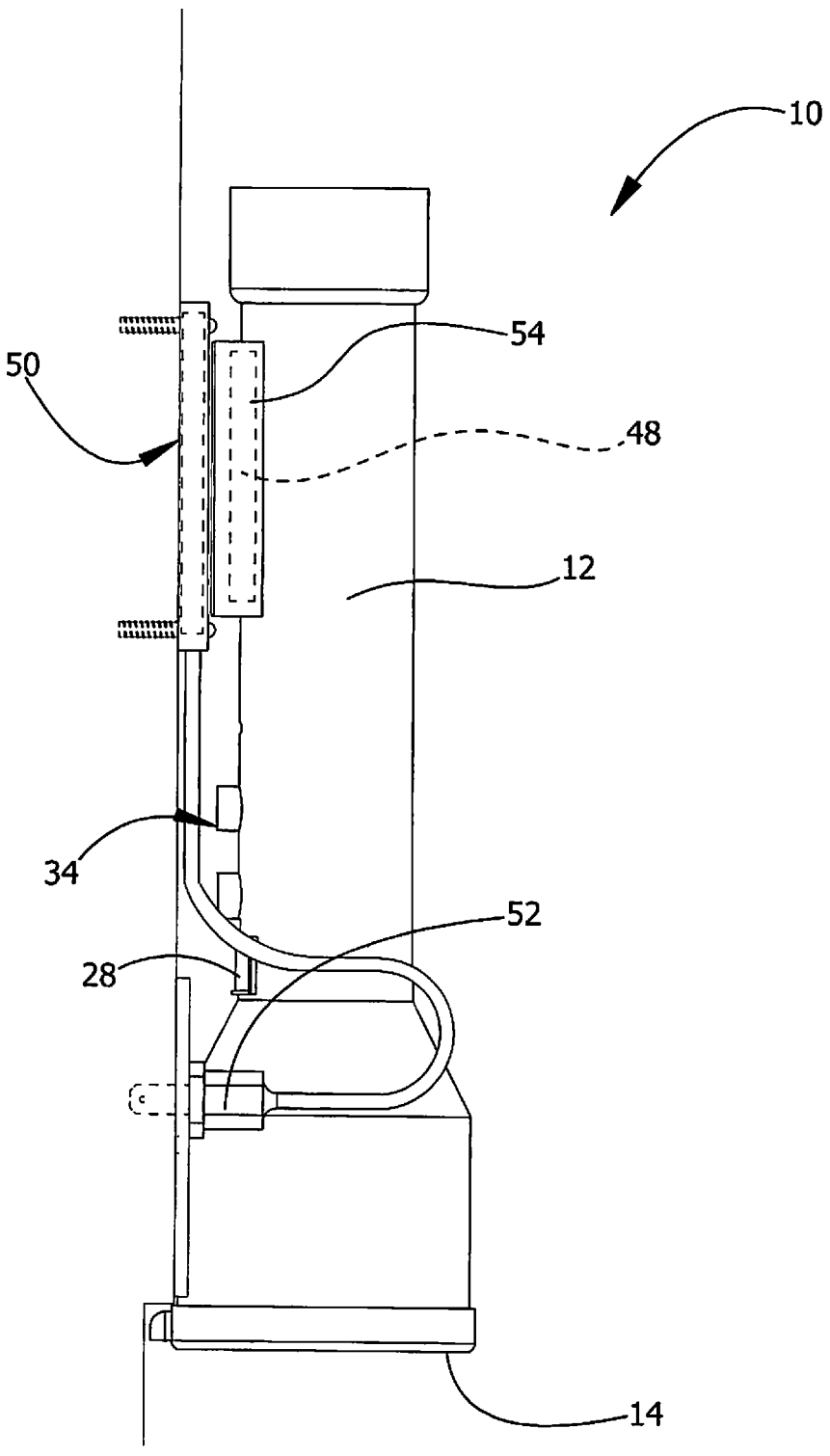
FIG. 6 is a side in-use view of an embodiment of the disclosure.
Figure 7:
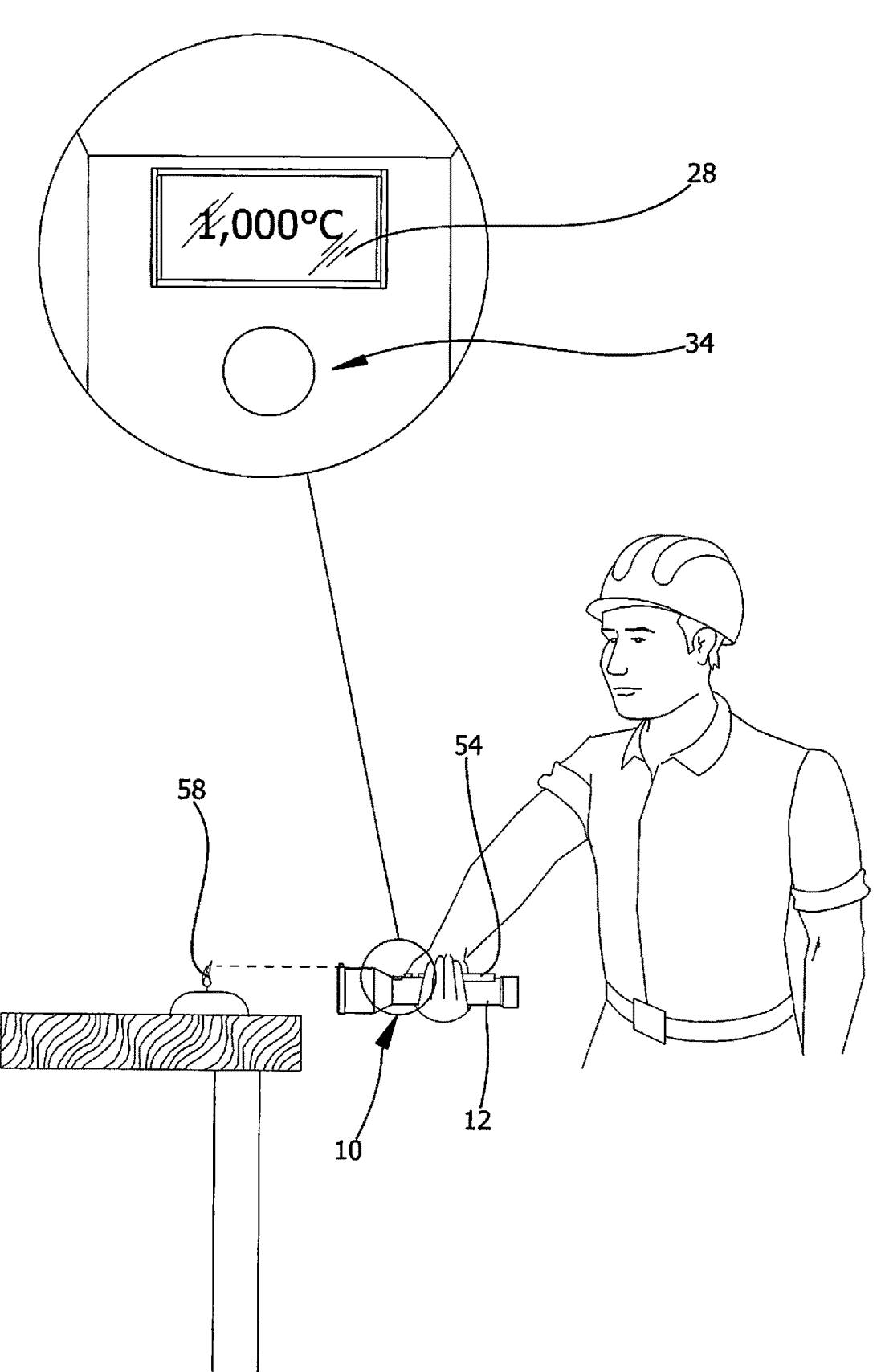
FIG. 7 is an in-use view of an embodiment of the disclosure.
Figure 9:
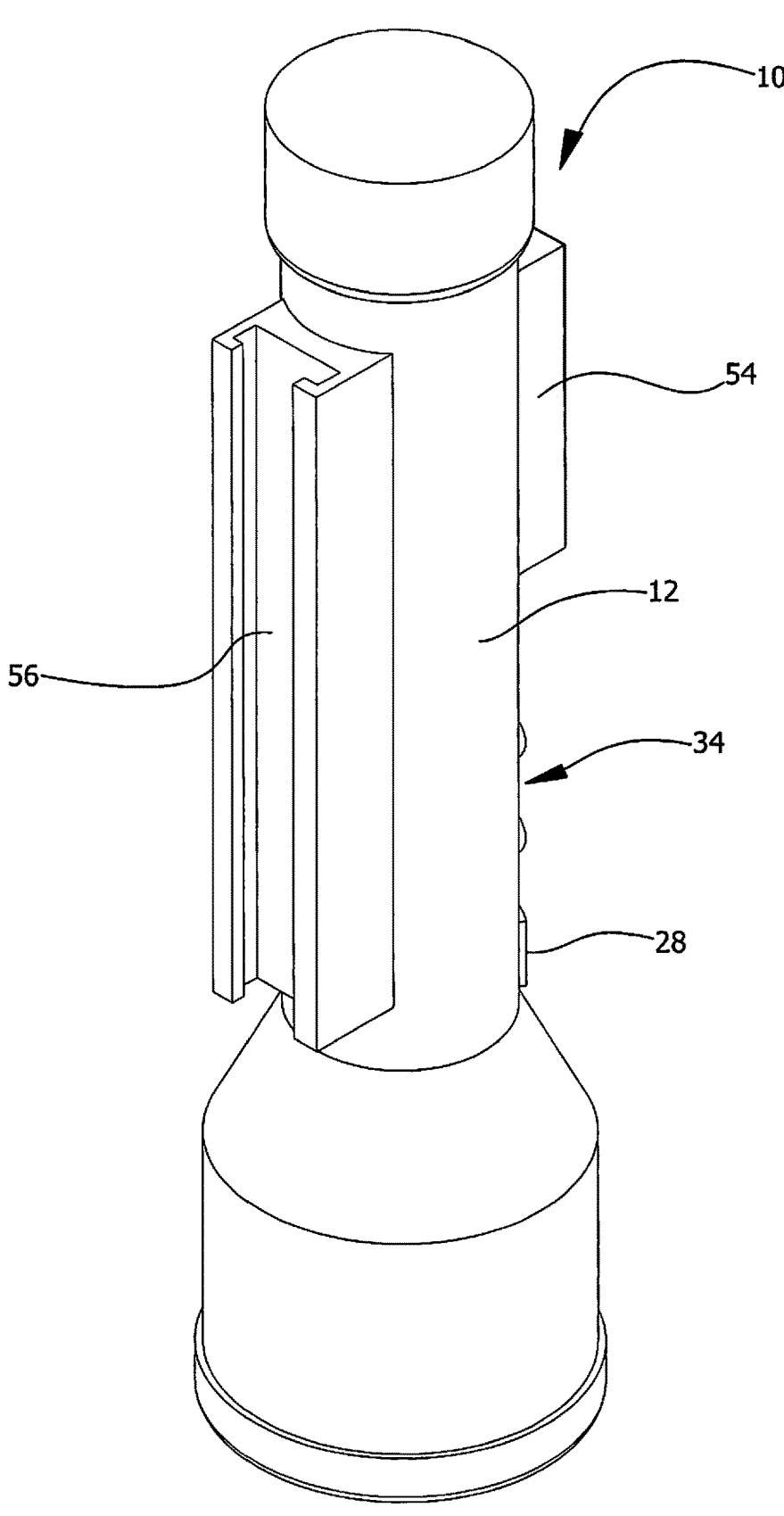
FIG. 9 is a perspective view of an embodiment of the disclosure with a mount attached to a housing to attach the housing to a firearm.
Figure 10:
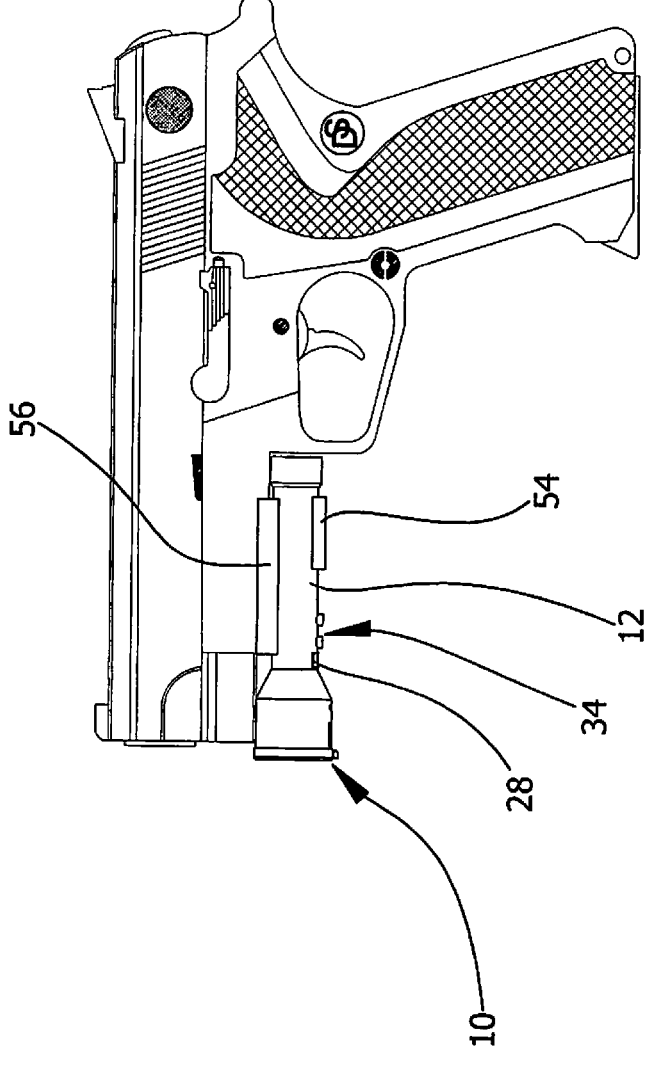
FIG. 10 is a side in-use view of an embodiment of the disclosure with a housing attached to a firearm.

With reference now to the drawings, and in particular to FIGS. 1 through 10 thereof, a new light and emergency alert system embodying the principles and concepts of an embodiment of the disclosure and generally designated by the reference numeral 10 will be described.

As best illustrated in FIGS. 1 through 10, the light and emergency alert system 10 generally comprises a housing 12 having an elongated tubular shape. A processor 18 is mounted in the housing 12 and operates a light source 20 mounted on an end 14 of the housing 12. A hazard detector 22 is mounted in the housing 12 adjacent to a vent 16 which extends through the housing 12. The hazard detector 22 is in communication with the processor 18 and is configured to sense hazardous conditions in a surrounding atmosphere. The hazardous conditions include a presence of smoke and a presence of a concentration of carbon monoxide greater than a predetermined threshold. The predetermined threshold may be, for example, 70 parts per million, 150 parts per million, or any other suitable threshold. An alarm indicator 24 is mounted to the housing 12 and is operably coupled to the processor 18. The processor 18 is programmed to selectively cause the alarm indicator 24 to emit an alert signal when the hazard detector 22 senses one of the hazardous conditions. The alert signal comprises an audible alarm but may comprise a visual alarm or any other suitable alarm. In some embodiments, the hazard detector 22 may also be configured to detect dangerous concentrations of carbon dioxide, and the processor 18 may cause the alarm indicator 24 to emit the alert signal when such dangerous concentrations are sensed.

A temperature sensor 26 is mounted to the end 14 of the housing 12 and is in communication with the processor 18. The temperature sensor 26 is configured to detect a temperature of a remote body 58. The temperature sensor 26 comprises an infrared sensor but may comprise any suitable type of temperature sensor 26. The temperature sensor 26 and the light source 20 are directed in a same direction away from the housing 12. In some embodiments, a laser or other indicator for aiming the temperature sensor 26 may be included to facilitate precise measurement of a temperature of a desired point of the remote body 58. The processor 18 may be used to determine the temperature of the remote body 58 based on infrared energy data detected by the temperature sensor 26.

A display 28 is mounted to the housing 12 and is operably coupled to the processor 18. The processor 18 is configured to cause the display 28 to present temperature data indicative of the temperature of the remote body 58. The display 28 may also selectively present carbon monoxide concentration data indicative of the carbon monoxide concentration sensed by the hazard detector 22, smoke data indicative of the presence or concentration of smoke, or other suitable data.

A transceiver 30 is connected to the processor 18 such that the processor 18 is configured to communicate with a remote user electronic device 60 via the transceiver 30. The remote user electronic device 60 may be a smartphone, a tablet, a computer, or the like. Data may be transmitted to the remote user electronic device 60 from the processor 18 for presentation to a user or use in an application stored on the remote user electronic device 60. The processor 18 may also receive operational commands from the remote user electronic device 60 via the transceiver 30.

A global positioning system (GPS) module 32 connected to the processor 18 and is configured to determine a location of the housing 12 via a GPS network. The processor 18 is configured to selectively transmit a location signal indicating the location of the housing 12 via the transceiver 30 to a remote rescue electronic device 62. The remote rescue electronic device 62 may be a smartphone, a tablet, a computer, or the like. The remote rescue electronic device 62 is typically separate from the remote user electronic device 60 may be integral thereto.

An input 34 is mounted to the housing 12 and is operatively coupled to the processor 18. The input 34 may be operated to control the processor 18. The processor 18 may, for example, be commanded via the input 34 to activate the temperature sensor 26 and cause the display 28 to present the temperature data. The input 34 may also be operated to alternately activate and deactivate the light source 20. The input 34 may include a toggle for directing the display 28 to present the temperature data in either of the Fahrenheit or Celsius scales or another temperature scale.

A power supply 36 is mounted in the housing 12 and is electrically coupled to the processor 18. The power supply 36 comprises a battery 38 but may comprise a capacitor or other suitable power storage. A charging port 40 is coupled to the housing 12 and is electrically coupled to the power supply 36. The charging port 40 may be a Universal Serial Bus Type-C (USB-C) port or may be any suitable charging port 40. A solar charger 42 is provided which comprises a solar panel 44 and a charging connector 46. The charging connector 46 is electrically coupled to the solar panel 44 and is electrically couplable to the charging port 40 to transmit electricity to the power supply 36. Other chargers which rely on alternate power sources to solar power may also be provided and used to charge the power supply 36 via the charging port 40.

A wireless charging receiver 48 is mounted to the housing 12 and is electrically coupled to the power supply 36. A wireless charger 50 is operable to wirelessly transmit electricity to the wireless charging receiver 48. The wireless charger 50 comprises an electrical plug 52 configured for electrically coupling to an external power source via an outlet or other suitable means. A mounting magnet 54 is mounted to the wireless charging module 32 and is removably couplable to the wireless charger 50 to mount the housing 12 to the wireless charger 50. The wireless charger 50 may be mountable to a structure via threaded fasteners or the like.

In some embodiments, a mount 56 may be attached to the housing 12 to secure the housing 12 to clothing, firearms 64, or other suitable mounting structures. The mount 56 may include, for example, slide keepers, hook-and-loop fasteners, elastic bands, any one of various barrel mounts for firearms 64 to direct the light source 20 and the temperature sensor 26 in a similar direction to a firing end of a firearm 64, magnets, and malleable members to attach or rest on various structures and adjust an orientation of the housing 12 with respect to such structures.

In use, the processor 18 is operated by the input 34 or the remote user electronic device 60 to selectively emit light from the light source 20, detect temperature of the remote body 58, and transmit the location signal to the remote rescue electronic device 62. The hazard detector 22 senses for the hazardous conditions, and the processor 18 causes the alarm indicator 24 to emit the alert signal if a hazardous condition is sensed. In some embodiments, the light source 20 may emit light in a strobe pattern, or a strobe pattern may be selectable via the input 34 or the remote user electronic device 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A light and emergency alert system comprising:
a housing;
a processor mounted in the housing;
a light source mounted to the housing, the light source being directed away from the housing, the light source being operably coupled to the processor;

a hazard detector mounted in the housing adjacent to a vent extending through the housing, the hazard detector being in communication with the processor, the hazard detector being configured to sense hazardous conditions in a surrounding atmosphere, the hazardous conditions including a presence of smoke and a presence of a concentration of carbon monoxide greater than a predetermined threshold;

an alarm indicator mounted to the housing and operably coupled to the processor, the processor being configured to cause the alarm indicator to emit an alert signal when the hazard detector senses one of the hazardous conditions;

a temperature sensor mounted to the housing, the temperature sensor being in communication with the processor, the temperature sensor being configured to detect a temperature of a remote body;

a display mounted to the housing and being operably coupled to the processor, the processor being configured to cause the display to present temperature data indicative of the temperature of the remote body;

a transceiver connected to the processor wherein the processor is configured to communicate with a remote user electronic device via the transceiver;

a power supply mounted in the housing and electrically coupled to the processor;

a battery;

a charging port coupled to the housing and electrically coupled to the power supply;

a solar charger comprising a solar panel and a charging connector, the charging connector being electrically coupled to the solar panel and being electrically couplable to the charging port to transmit electricity to the power supply;

a wireless charging receiver mounted to the housing and electrically coupled to the power supply;

a wireless charger being operable to wirelessly transmit electricity to the wireless charging receiver, the wireless charger comprising an electrical plug configured for electrically coupling to an external power source; and a mounting magnet mounted to the wireless charging module, the mounting magnet being removably couplable to the wireless charger to mount the housing to the wireless charger.

2. The system of claim 1, wherein the temperature sensor comprises an infrared sensor.

3. The system of claim 1, wherein the temperature sensor and the light source are directed in a same direction.

4. The system of claim 1, further comprising a global positioning system (GPS) module connected to the processor, the GPS module being configured to determine a location of the housing via a GPS network, the processor being configured to selectively transmit a location signal indicating the location of the housing via the transceiver to a remote rescue electronic device.

5. The system of claim 1, further comprising an input mounted to the housing and operatively coupled to the processor.

6. The system of claim 1, wherein the alert signal comprises an audible alarm.

7. A light and emergency alert system comprising:
a housing, the housing having an elongated tubular shape;

a processor mounted in the housing;

a light source mounted on an end of the housing, the light source being directed away from the housing, the light source being operably coupled to the processor;

a hazard detector mounted in the housing adjacent to a vent extending through the housing, the hazard detector being in communication with the processor, the hazard detector being configured to sense hazardous conditions in a surrounding atmosphere, the hazardous conditions including a presence of smoke and a presence of a concentration of carbon monoxide greater than a predetermined threshold;

an alarm indicator mounted to the housing and operably coupled to the processor, the processor being configured to cause the alarm indicator to emit an alert signal when the hazard detector senses one of the hazardous conditions, the alert signal comprising an audible alarm;

a temperature sensor mounted to the end of the housing, the temperature sensor being in communication with the processor, the temperature sensor being configured to detect a temperature of a remote body, the temperature sensor comprising an infrared sensor, the temperature sensor and the light source being directed in a same direction;

a display mounted to the housing and being operably coupled to the processor, the processor being configured to cause the display to present temperature data indicative of the temperature of the remote body;

a transceiver connected to the processor wherein the processor is configured to communicate with a remote user electronic device via the transceiver;

a global positioning system (GPS) module connected to the processor, the GPS module being configured to determine a location of the housing via a GPS network, the processor being configured to selectively transmit a location signal indicating the location of the housing via the transceiver to a remote rescue electronic device;

an input mounted to the housing and operatively coupled to the processor;

a power supply mounted in the housing and electrically coupled to the processor, the power supply comprising a battery;

a charging port coupled to the housing and electrically coupled to the power supply;

a wireless charging receiver mounted to the housing and electrically coupled to the power supply;

a mounting magnet mounted to the wireless charging module;

a wireless charger being operable to wirelessly transmit electricity to the wireless charging receiver, the mounting magnet being removably couplable to the wireless charger to mount the housing to the wireless charger, the wireless charger comprising an electrical plug configured for electrically coupling to an external power source; and a solar charger comprising a solar panel and a charging connector, the charging connector being electrically coupled to the solar panel and being electrically couplable to the charging port to transmit electricity to the power supply.

* * * * *